No. 679,138. Patented July 23, 1901.
L. BELL.
ELECTRIC METERING SYSTEM.
(Application filed Mar. 26, 1900.)
(No Model.)
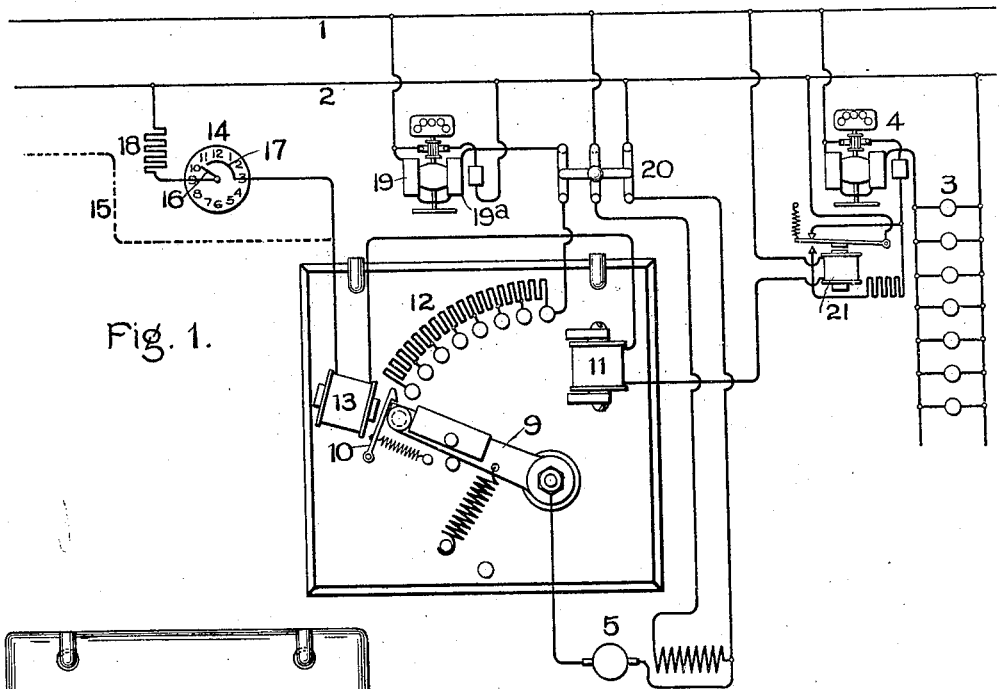
Fig. 1.
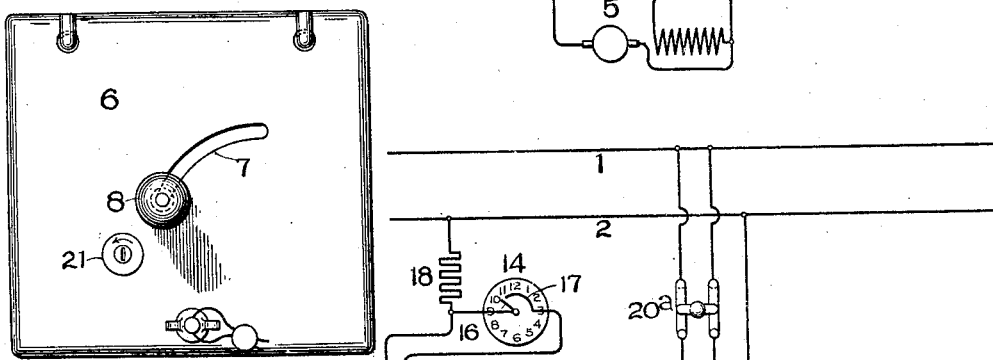
Fig. 3. Fig. 2.
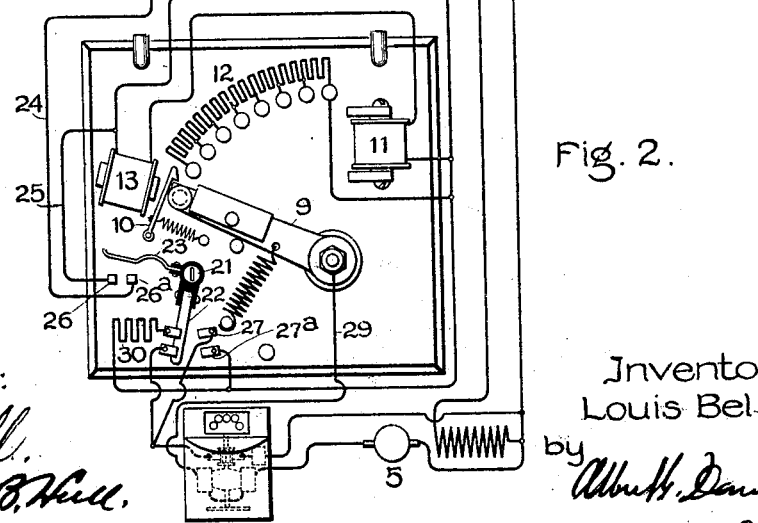
Witnesses:
Lewis E. Abell.
Benjamin B. Hull.
Inventor:
Louis Bell,
by Albert H. Davis,
Atty.

UNITED STATES PATENT OFFICE.

LOUIS BELL, OF NEWTON CENTER, MASSACHUSETTS, ASSIGNOR TO GENERAL ELECTRIC COMPANY, OF NEW YORK.

ELECTRIC METERING SYSTEM.

SPECIFICATION forming part of Letters Patent No. 679,138, dated July 23, 1901.

Application filed March 26, 1900. Serial No. 10,130. (No model.)

*To all whom it may concern:*

Be it known that I, LOUIS BELL, a citizen of the United States, residing at Newton Center, in the county of Middlesex and State of Massachusetts, have invented certain new and useful Improvements in Electric Metering Systems, (Case No. 1,148,) of which the following is a specification.

The present invention relates to electric metering systems, one object being to encourage the use of current by consumers during periods of light load on the distribution-circuit, so as to promote more uniform and economical operation of the supply system.

One of the most serious problems that a central-station manager has to face is the great inequality in the consumption of current during different hours of the day. From a period beginning between three and five o'clock in the afternoon the load on the system rapidly increases, while during the morning hours but little current is used. This requires a large amount of reserve power in generators at the station and on other apparatus for the production of current, which is idle for a large portion of the time. It is the practice of many station managers to endeavor to equalize the load by offering consumers a discount or lower charge rate for current during the periods of low load on the system. This tends not only to promote a larger use of current during the periods of low load, but tends also to divert a considerable amount of consumed energy from the periods of high load, thereby cutting down the peaks in the load curve and permitting a more economical operation of the system.

Another object of the present invention is to contribute an incentive, particularly to such consumers as use electric motors, by establishing a low rate for the current used by such motors and arranging the connections so that the motor will be automatically cut out and locked out during the peak in the load curve. It provides also for the permissive use of the motors during high-load periods, but at a punitive rate, thereby tending strongly to discourage the use of current during such periods, but still permitting the consumer to operate his motors in case of emergency.

In carrying out my invention I provide a sealed starting-box for an electric motor, the operating-handle of which is accessible from the outside, and controlling devices by which the motor will be cut out and locked against further operation at times of high load. I provide also means by which the lock may be removed, if desired, but insure that in such case the circuit connections of the metering apparatus will be so made that a higher charge rate may be made for such use.

I prefer to effect the automatic control of the starting device by electrical agencies, and for this purpose may employ either a clock which electrically releases the operating-handle at certain hours or a control-wire leading from a central station, by which motors located at different parts of the distributing system may be simultaneously rendered operative. In order to permit the use of the motor at a punitive rate during periods of high load, I prefer to employ a mechanically-controlled device by which the circuits inaccessible from the outside of the starting device are changed or commuted, so as to operate the meter at a punitive rate.

The various features of novelty of my invention will be hereinafter more particularly described and will be definitely indicated in the claims appended hereto.

In the accompanying drawings, which illustrate the invention, Figure 1 is a diagram of an equipment for a consumer's plant by which a motor is automatically switched out or rendered inoperative during periods of high load. Fig. 2 shows a modification in which the motor may be operated during periods of high load, but only at a higher rate of charge. Fig. 3 is a plan view of the starting-box, showing the cover and handle of the operating-lever, the control-circuits being under seal and inaccessible to the consumer.

Referring first to Fig. 1, 1 and 2 represent a distribution-circuit leading from a suitable source of current-supply.

3 represents a lighting-circuit, and 4 a two-rate meter governing said circuit, all within the consumer's premises.

5 represents an electric motor which is controlled by a starting-box provided with a sealed cover 6, through a slot 7 in which projects a button or handle 8, secured to the operating-lever 9. When the motor is out of circuit, this lever is drawn by a spring against a fixed stop and opens the armature-circuit, and is latched in such position by a detent carried by a spring-retracted armature 10. The lever 9 carries an armature adapted to coöperate with the pole-pieces of a magnet 11, which is cut into circuit when the motor is drawing current and which holds the lever as long as the motor is drawing current. The starting-box is provided with the usual variable resistance 12 to insure a safe cutting in and out of the motor. In circuit with the magnets 11 and 13 is a control device by which they may be deënergized at a desired hour, determined by the central-station manager, when the period of high load comes on the system. This may be either a clock-controlled device, such as indicated at 14, or may be a control-wire, such as 15, leading to the central station and under the direct manipulation of a central-station employee. If a clock be employed, it should preferably be a self-winding clock and be provided with a circuit-closer, such as indicated at 16, which at the time of low load engages an arc-shaped contact 17 and closes the circuit of magnets 11 and 13 through a suitable resistance 18 during the period of low load on the system.

The clock here indicated in diagram gives the low rate from eleven until three, a. m. and p. m.; but I may use in practice a twenty-four-hour clock with an adjustable discount period. Such clocks are well known in the art and need not be more fully described herein.

The motor-circuit includes the series coils 19 19$^a$ of an electric meter—such, for example, as the well-known Thomson recording-wattmeter, which is the form shown diagrammatically in the drawings—the potential circuit of which may be connected through a resistance with the supply-mains of the system in the usual manner, as indicated in the diagram.

From the description just given it will be evident that when the cover 6 has been placed on the starting-box and sealed the starting-lever 9 will be locked against movement during periods of high load on the system, since at such times the control-circuit leading from the clock or central station is open and the magnets 11 and 13 deënergized. If at the time when the peak of the load occurs the motor is in service, the opening of the control-circuit deënergizes the magnet 11, releasing the armature on lever 9 and permitting the spring to cut out the motor, the armature 10 automatically locking it in such position. It will be evident that it will be beyond the power of the consumer to cut in his motor after it is so locked. An auxiliary switch 20 may be employed to open all the circuits during periods of high load. The control-circuit may also include a magnet 21, by which resistance may be cut in or out of one of the operative circuits of a two-rate meter 4 for the lamp-circuit, thereby encouraging also the use of lamps as far as possible during periods of low load.

In some cases where the use of the motor laps over the peak of the load curve it will be desirable to provide the consumer with means for continuing the operation of his motor, but at a higher charge rate, thereby securing all the advantages presented by the organization shown in Fig. 1 without subjecting the consumer to annoyance. In this case I provide an organization by which the consumer may release the lock on his starting-rheostat, but insure that in so doing he will change the meter connections, so that a higher recording rate will be established. A suitable organization for this purpose is shown in Fig. 2. In this case there may be provided a key operating a lock 21 from the outside of the cover and controlling a switch-blade 22 inside of the starting-box, such blade coöperating with two sets of clips for changing the meter rate. On the same stem which carries the switch-blade 22 is mounted a contact-piece 23, which closes a branch circuit around the controlling device 14. During the period of low load the control device will have closed the control-circuit and magnets 13 and 11 will have been energized, thereby permitting the starting-lever to be moved and the motor to be operated. At the instant of maximum load this control-circuit is opened and the starting-lever is drawn back and locked, as in the case of Fig. 1; but if it is highly desirable to continue the operation of the motor the consumer or a trusted employee may insert his key and operate the switch 22 23, thereby closing a branch circuit through the magnets 11 and 13 independent of the control device 14 by way of wires 24 25 and contacts 26 26$^a$. Simultaneously the switch-blade 22 will have passed from the position shown in Fig. 2 and brought into engagement with clips 27 27$^a$, closing the meter-circuit from main 1 by way of wall-switch 20$^a$ to the starting-lever, (assuming the motor to have been cut in,) thence by wire 29 to the field-coils and motor, the resistance 30 is cut out of the potential circuit, the latter being closed by way of clip 27$^a$ across the switch-blade to clip 27, thence to the meter-armature back to main 2. In the position of the parts shown in Fig. 2 a resistance 30 is included in the meter-armature or potential circuit; but when the switch is shifted to the opposite position just traced this resistance is cut out, thereby insuring a higher recording rate for the meter. Thus it will be seen that by the organization herein described I provide for the automatic control of motors in the system and encourage their use during periods of low load.

While I have above described my invention as applicable to consumers using measured current, it is not necessarily confined to such application, as parts are of use in other cases. For example, the control device and unlocking means might be used where a contract price is made based on use of current during low-load periods; but the consumer might be allowed to lap over the load peak at a punitive rate, and in such case in using his control device or key he would cut into a circuit a meter to register the extent of lap load.

What I claim as new, and desire to secure by Letters Patent of the United States, is—

1. In an electric system, the combination of a supply-circuit, an electric motor, a starting device, and means for disabling the normal operation of the starting device during time periods regulable by the supply company.

2. In an electric metering system, the combination of a supply-circuit, an electric motor, a starting device, an electric meter, and means for disabling the normal operation of the starting device during time periods regulable by the supply company.

3. In an electric metering system, the combination of a supply-circuit, an electric motor, a meter for measuring its current, a starting device, and a control-circuit for disabling the normal operation of the starting device during time periods regulable by the supply company.

4. In an electric metering system, the combination of a supply-circuit, a current-consuming device, an electric meter for recording its current consumption, and means for disabling the normal operation of the starting device during time periods regulable by the supply company.

5. In an electric metering system, the combination of a supply-circuit, current-consuming devices, current-measuring devices in circuit therewith, means for cutting the consuming devices out of circuit at determinate periods, independent means for cutting them in during such periods, and a switch operated by the latter for changing the rate of registration of the current-measuring devices.

6. In an electric supply system, the combination at a consumer's station of current-consuming devices, means, not under the consumer's control, for cutting them out at determinate periods, means under the consumer's control for cutting them in during such periods, and means for measuring the current when so cut in.

7. In an electric supply system, the combination of a supply-circuit, an electric motor, a starting-rheostat, means independent of the operator for cutting out the rheostat for determinate periods of time, and a lock to prevent its being cut in until the period has passed.

8. In an electric supply system, the combination of a supply-circuit, an electric motor, a starting-rheostat, electromagnetic devices for cutting it out, an electromagnetic lock for holding it out, and a control-circuit operated independently of the consumer at determinate time periods governing said devices.

9. In an electric supply system, the combination at a consumer's station of translating devices, a control-circuit for cutting them out at determinate periods, a lock for holding them out, means under control of the consumer for releasing the lock, and a meter controlled thereby to determine the extent of punitive use.

10. In an electric supply system, the combination at a consumer's station of translating devices, a control-circuit for cutting them out at determinate periods, a lock for holding them out, means under control of the consumer for releasing the lock, a two-rate meter to measure the current consumed, and connections for changing the meter rate when the lock is released.

11. In an electric metering system, the combination of a supply-circuit, a motor, a starting-box, an electric lock under seal in said box, means for automatically releasing the lock at determinate time intervals, and an operating-handle projecting from the box.

12. In an electric supply system, a translating device, a two-rate apparatus, means for withdrawing the supply of current from the translating device, and means for restoring the supply and simultaneously changing the registering rate.

In witness whereof I have hereunto set my hand this 23d day of March, 1900.

LOUIS BELL.

Witnesses:
WM. S. YOUNGMAN,
J. LEWIS STACKPOLE, Jr.